United States Patent [19]

Ritzerfeld

[11] 4,029,413

[45] June 14, 1977

[54] COPIER WITH MEANS FOR HANDLING COMPONENTS OF FORM LETTERS, AND THE LIKE

[76] Inventor: Gerhard Ritzerfeld, Schorlemer Allee 14, 1000 Berlin 33, Germany

[22] Filed: Oct. 23, 1975

[21] Appl. No.: 625,164

[30] Foreign Application Priority Data

Nov. 1, 1974  Germany ............................ 2452430

[52] U.S. Cl. .................................................. 355/75
[51] Int. Cl.² ........................................ G03B 27/62
[58] Field of Search ................. 355/75, 74, 40, 47, 355/7, 8, 11

[56] References Cited

UNITED STATES PATENTS

| 2,326,367 | 8/1943 | Krug .................................... 355/40 |
| 3,020,801 | 2/1962 | Lander et al. ................... 355/74 X |
| 3,025,778 | 3/1962 | Stuckens ....................... 355/75 UX |
| 3,627,411 | 12/1971 | Nagel ........................... 355/75 X |
| 3,642,370 | 2/1972 | Meredith et al. ................. 355/75 |
| 3,721,173 | 3/1973 | Jaffe ................................. 355/75 |
| 3,880,521 | 4/1975 | Eppe et al. ......................... 355/75 |

Primary Examiner—Donald A. Griffin
Attorney, Agent, or Firm—Michael J. Striker

[57] ABSTRACT

The copier has a transparent support upon which originals to be copied are laid with their image-bearing sides face down. The image-bearing sides are illuminated and reproductions are made of the illuminated images. An arrangement for use in the reproduction of printed forms, form letters, and the like, includes first and second holding devices located adjacent the transparent support. The first holding device holds two lower originals which serve as masks and are spaced apart to form an intermediate slit. The second holding device holds an upper original located above the lower originals with a portion of the upper original showing through the slit and being unblocked for illumination. At least one holding device is mounted movable relative to the other in the direction of the length of the transparent support. By effecting such relative movement, different lines or portions of an image on the upper original can be unblocked by the mask for illumination and reproduction.

19 Claims, 6 Drawing Figures

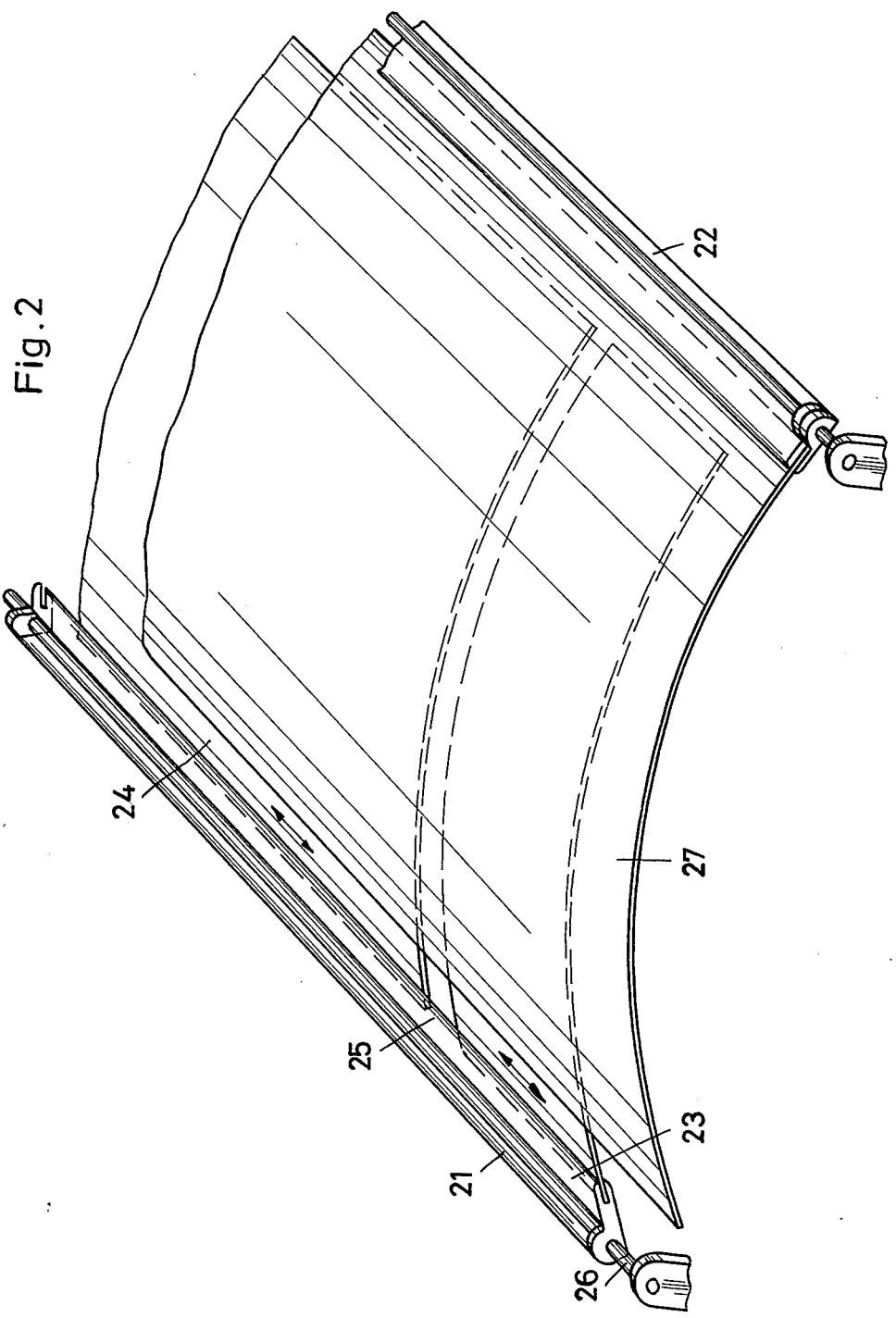

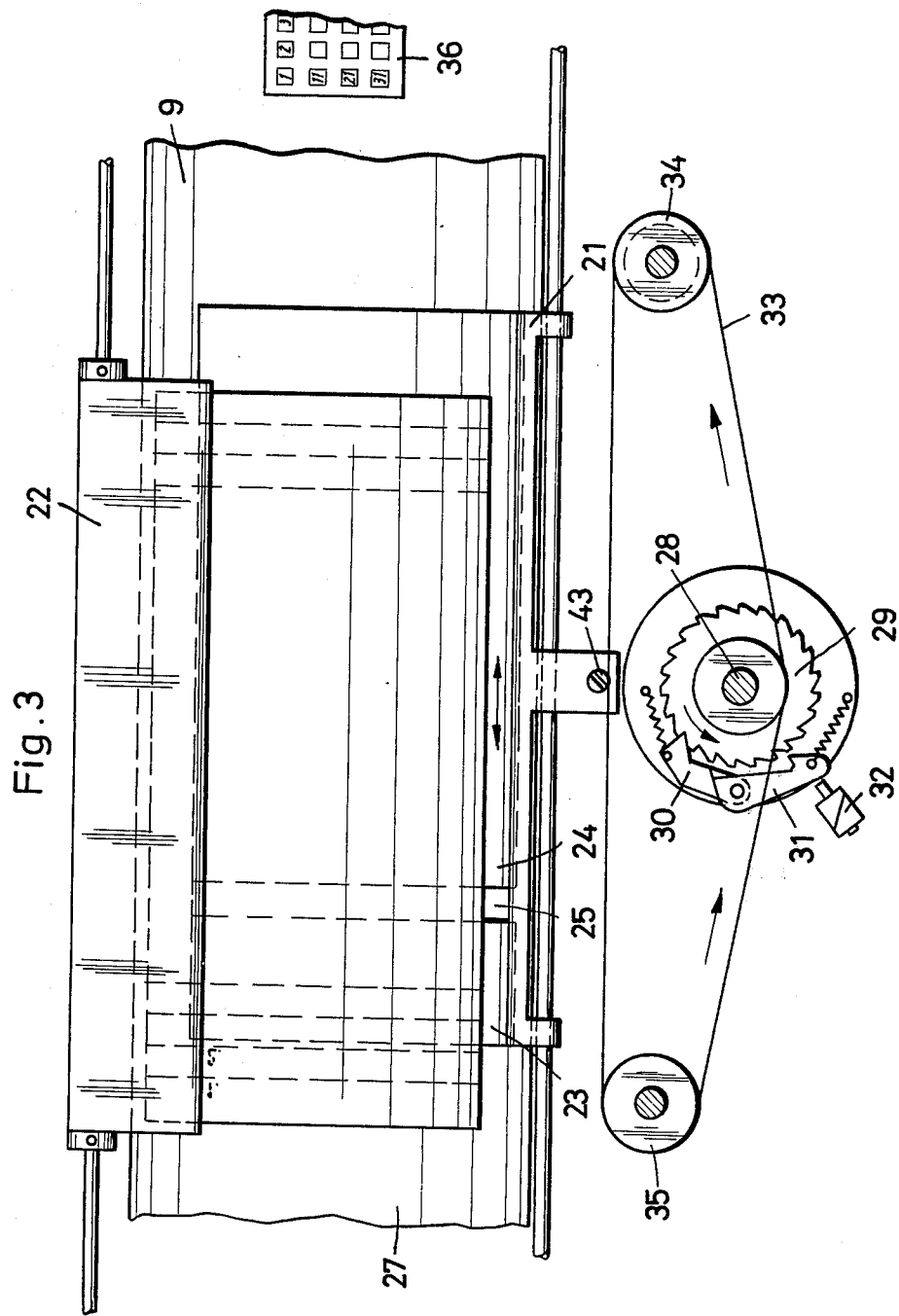

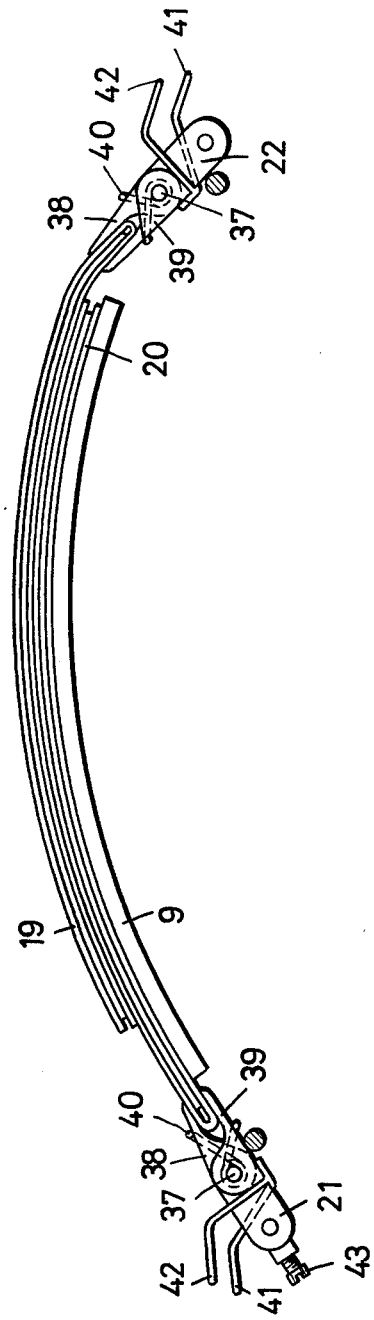

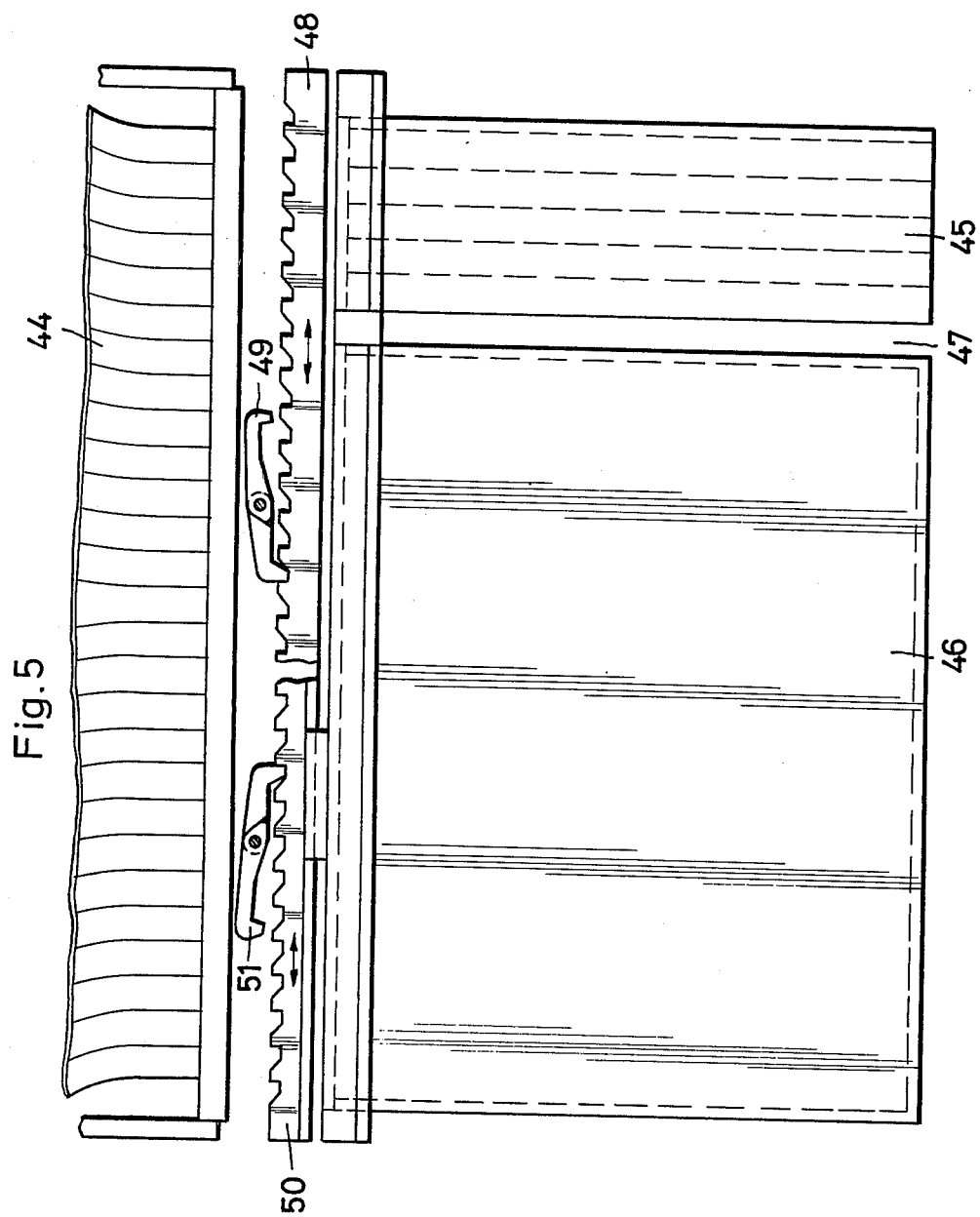

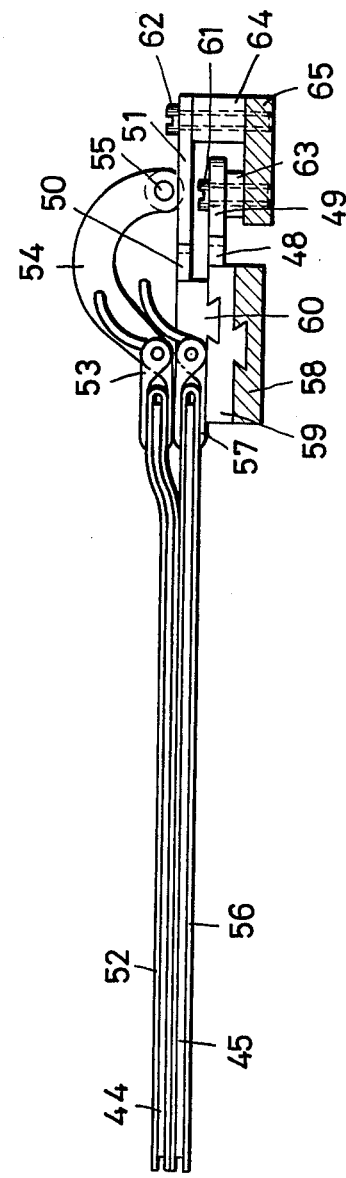

COPIER WITH MEANS FOR HANDLING COMPONENTS OF FORM LETTERS, AND THE LIKE

BACKGROUND OF THE INVENTION

The invention relates to copiers of the type comprised of a transparent support upon which originals to be copied are laid with their image-bearing sides face down, illuminating means for illuminating the image-bearing sides of such originals and means for forming reproductions of the illuminated originals. The transparent support is most often a planar or part-cylindrical glass plate.

It is already known to use a copier of the type in question to effect the reproduction of only selected portions of individual originals. It is for example known to use a selecting arrangement to charge only linear sections of a photoconductive printing form secured to a rotating printing element, with the charged linear sections corresponding to the portions of the original selected for reproduction. Alternatively, it is known to control the illumination of the image-bearing side of the original in a sectional manner to make possible the transfer of the printing form of only selected sections of the image.

The known expedients serve their purpose. However, they require special design of the copier proper. If an attempt is made to apply one of the known expedients to a copier of conventional design, the number of modifications which must be made in the copier proper is very considerable.

SUMMARY OF THE INVENTION

It is accordingly a general object of the invention to provide a way of effecting reproduction of only selected portions of originals such as to be readily applicable to existing copiers of conventional design.

More specifically, it is an object to provide an arrangement for causing only selected portions of originals to be reproduced so designed as to constitute an accessory for already existing copiers of conventional design.

These objects, and others which will become clearer below, can be met, according to one advantageous concept of the invention, by arranging two lower mask sections or originals on the transparent support, with these lower sections being spaced to form a linewise-extending slit. These sections are shiftable together along the length of the transparent support in a direction corresponding to successive lines of a printed page. Arranged above these lower sections is an upper original not shiftable in the aforementioned direction. As the lower sections are shifted, successive lines of the upper original come into view through the aforementioned slit for exposure to light. Advantageously, this arrangement includes a first holding device, preferably a clamping device, arranged at the edge of the transparent support for securely holding and shifting the lower mask sections between which the unblocking slit is defined. A second holding device, likewise preferably a clamping device, is provided for securely holding in place the non-shiftable original.

According to one concept of the invention, the first holding device can be advanced by an intermittent advancement mechanism such as a stepper-motor or a step-by-step transmission. Advantageously, the intermittent advancement mechanism causes the first holding device to shift by one step to the next line of the original in automatic response to the performance of an illumination by the illuminating means of the copier. This synchronization can be effected by means of a contact making clock, or other electromechanical or mechanical synchronizer.

To facilitate the selection of the sections of the original which are to be illuminated, selector buttons or keys can be provided for the first holding device.

Advantageously, the first holding device, which holds the mask sections in place and shifts them, can be comprised of two parts at least one of which is shiftable in the aforementioned direction relative to the other, to facilitate the making of changes in the breadth of the mask slit.

Advantageously the mask sections or lower originals and the upper original are held in transparent plastic jackets. The mask sections and original can be directly engaged by the holding device, e.g., clamping device, while in the plastic jacket or else merely be held in the plastic jacket with only the jacket being directly engaged or clamped.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 depicts the originals or mask sections to be illuminated on the support plate of the copier of FIG. 1;

FIG. 3 depicts an arrangement for effecting line-by-line transport of the original and a mask for use with the copier of FIG. 1;

FIG. 4 depicts the holding device for originals or mask sections to be used with the copier of FIG. 1;

FIG. 5 depicts another arrangement of the originals or mask sections to be illuminated with means for effecting line-by-line unblocking of sections of the upper original; and FIG. 6 depicts the holding and transport means of FIG. 5 in an end view.

DESCRIPTION OF THE PREFERRED EMBODIMENTS

Figure 1:
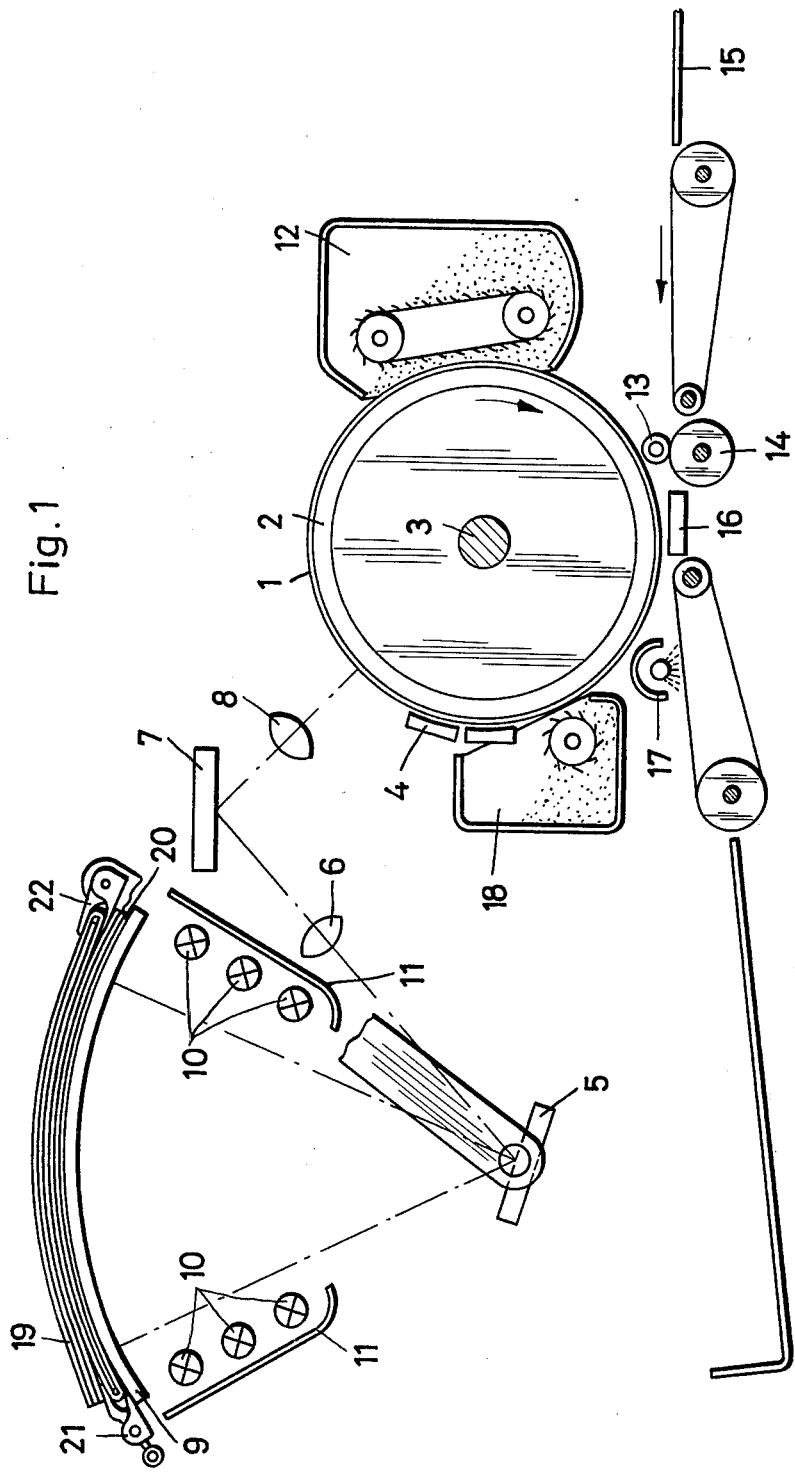
FIG. 1 is a simplified schematic view of a xerographic copier.

The xerographic copier depicted in FIG. 1 includes a drum 2 provided with a selenium coating 1. Drum 2 is rotated about shaft 3 by a non-illustrated drive. Arranged at the outer periphery of drum 2 is a charging arrangement 4 which extends over the entire axial length of the drum. As each axially extending element of the drum surface moves past the charging arrangement 4 it is electrostatically charged by the latter. A pivoting mirror 5, an optical system 6, a fixed mirror 7 and a further optical system 8 cooperate in per se known manner to project upon the selenium layer 1 a mirror image of an original laid upon a transparent support 9. The illumination of the original is performed by means of lamps 10 and cooperating back reflectors 11.

The pivoting mirror 5 is moved in synchronism with the rotation of drum 2 so as to project upon the selenium layer 1 the uncovered sections of the originals laid upon the support 9. The charge previously established upon the selenium layer 1 by the charging arrangement 4 is discharged where light falls upon the selenium layer and to an extent dependent upon the intensity of the light, thereby forming an electrostatic latent image of the uncovered section of the original. As the drum 2 continues to rotate, the portions of the selenium layer 1 bearing the electrostatic latent image move into the region of a powder applying arrangement 12 operative for bringing the selenium layer into contact with a powder which adheres only to the charged portions of the layer. A sheet 15 fed into the arrangement by infeed rollers 13, 14 is moved past the drum 2 during a predetermined time interval. As the sheet 15 moves past the drum 2, a discharging arrangement 16 causes the powder image to be transferred from the selenium layer 1 to the sheet 15. Thereafter, the sheet 15, bearing the powder image, moves past a fixing station in which the powder image is fused by means of an infrared radiator 17. The selenium layer 1 is cleaned of residual powder at a cleaning station 18 before being recharged. The originals, with their printed sides facing down towards the transparent support 9, are arranged in transparent jackets 19, 20 which in turn are held in place by clamping devices 21 and 22 which extend along the full length of the transparent support 9. Alternatively, the originals can be clamped at their ends directly between the clamping members of each holding device 21 or 22.

FIG. 2 depicts the arrangement of the originals or mask sections. For the sake of clarity the transparent jackets 19, 20 in which the originals or mask sections are arranged are not depicted in FIG. 2. However, it will be understood that the lower jacket 20 contains the originals 23 and 24 which serve as mask sections defining an intermediate mask slit 25, whereas the upper jacket 19 contains the original 27. The slit 25 unblocks to view from below a section of the original 27. The clamping device 21 is mounted shiftably along a mounting rod 26, so that depending upon the position of the clamping device 21 different sections of the upper original 27 will be projected onto the selenium layer 1.

Whereas the mask sections 23 and 24 do indeed together form a mask, one or both of them may bear on the side thereof which faces towards the transparent support 9 printing to be reproduced. For example, one of them may bear a printed heading. Inasmuch as the images of both mask sections 23 and 24 will be reproduced, even if blank, and inasmuch as in some situations one or both will bear printing to be reproduced, mask sections 23, 24 are referred to herein as either mask sections or originals serving as mask sections. Accordingly, the original 27, bearing printed information individual lines or sections of which are to be selected for reproduction, is referred to as the upper original, whereas mask sections 23, 24 are referred to as the lower originals.

Very often the duplication which is to be performed involves the combination of an unchanging so-called head part or heading-bearing original with a second part which is changed from one duplicating operation to the next. In the illustrated embodiment, the shiftable original 23 contains the information for the heading, whereas the upper original 27 contains the plurality of lines of information which are to successively show through the mask slit. Usually, the shiftable original 24 serves merely to cover part of the upper original 27 and is accordingly not covered with printed material, although as indicated above it may also bear printed information or the like in certain instances.

Accordingly, with the illustrated arrangement it is possible to make a series of copies each composed of the same heading and directly adjacent the heading different respective printed information corresponding to the successively unblocked sections of the upper original. When it is necessary to make reproductions consisting of both the heading and all the data contained on the upper original, then this can be accomplished by removing the original 24 from the lower jacket 20 and shifting the original 23 in such a manner that the originals 23 and 27 are arranged one next to the other.

FIG. 3 depicts an arrangement for effecting stepwise shifting of the lower clamping device 21 with its jacket 20 and the originals 23 and 24 contained therein. For this purpose there is used a per se conventional intermittent advancement mechanism comprised of a ratchet wheel 29 subjected to the force of a non-illustrated biasing spring and rotatable about a shaft 28, a detent 30 and a blocking member 31. Briefly energizing an electromagnet 32 which moves the detent 30 and blocking member 31, causes the ratchet wheel 29 to turn through one step, corresponding to the angular spacing between adjoining ratchet teeth, under the action of the non-illustrated drive spring of the ratchet wheel.

The ratchet wheel 29 drives the clamping device 21 through the intermediary of a cable 33 and rollers 34 and 35, with each brief energization of electromagnet 32 causing the lower originals 23, 24 to be shifted relative to the upper original 27 by a distance corresponding to the spacing between two neighboring lines on the upper original 27. Associated with the individual lines of the original 27 are corresponding buttons of a keyboard 36. Depression of any one of the buttons causes a (non-illustrated) electrical control circuit to effect brief intermittent energization of electromagnet 32 a number of times corresponding to the number of steps necessary to bring the originals 23 and 24 into the desired position for unblocking the selected line on original 27.

The drive spring for ratchet wheel 29 becomes wound down as the ratchet wheel 29 performs its step-by-step rotation but can be rewound by means of a (non-illustrated) rewinding drive which can be coupled by a (non-illustrated) clutch to the roller 34. Such rewinding of the ratchet wheel drive spring concomitantly causes the originals 23 and 24 to return to their starting position. Instead of the illustrated intermittent advancement mechanism use could be made, for example, of an analogously controlled electrical stepper motor.

In general, when making a series of copies using the illustrated arrangement, it will be desired that the data for the successive copies be taken from successive lines of the upper original. In such event, it will be desirable to effect a step-by-step transport of the originals 23 and 24 through steps corresponding to the spacing between adjoining lines, alternate lines, every third line, or the like, with each transport step being performed in automatic response to each illumination of the original. Alternatively, each illumination of the original could be performed in automatic response to the performance of a transport step. Such synchronization can be established using a contact clock provided with a rotating contact arm operative for controlling the energization of electromagnet 32 in synchronism with the rotation of the drum 2, or could be effected by another suitable mechanical or electromechanical synchronizer.

Another possibility contemplated by the invention is that of making the lower clamping device 21 of two parts, so that the lower originals 23 and 24 will each be held by a separating clamping device. These can be jointly shiftable in the way explained above. Additionally, however, one can be shiftable relative to the other in the longitudinal direction, to make it possible to make the mask slit 25 intermediate originals 23, 24 of any desired breadth or to even completely close the slit. This represents a particularly simple way of controlling the number of lines of the original 27 which are to be unblocked during each illumination. To effect this supplemental shifting of one part of the lower clamping device relative to the other part, use can be made of any of the same intermittent advancement mechanisms which can be used to effect shifting of the lower clamping device as a whole.

As shown in FIG. 4, the clamping devices 21, 22 are each comprised of two parts 38, 39. The two parts 38, 39 are pivotable relative to each other about a shaft 37. The ends of the parts 38, 39 which face towards the jacket or original to be clamped are pressed together by a spring 40. Manually activatable levers 41, 42, each of which is connected to one of the parts 38, 39 are activated by the user of the copier to release the clamping devices against the force of the springs 40. This makes it easy and simple to replace one jacket or original with another. A screw 43 is loosened when it is desired to longitudinally shift the lower clamping device 21.

FIGS. 5 and 6 schematically depict the arrangement of the individual originals and their associated holding devices in the case of an electrostatic copier having a planar glass support for the originals. The upper original 44, which is not shiftable longitudinally of the glass support, is shown folded up and away so as to expose to view the lower originals 45, 46 and the slit 47 intermediate the latter. Preferably, the original 45 contains the heading of the printed matter to be copied adjacent to which there will be exposed to view the information on the original 44 showing through the slit 47. Preferably, the original 46 serves exclusively to mask a part of the original 44.

The originals 45 and 46 are arranged in transparent jackets secured in clamping devices arranged one behind the other. Both originals can be shifted as a unit by means of a per se known intermittent advancement mechanism of which only a rack 48 and a detent 49 are illustrated. The rack 48 is normally urged towards the right by a non-illustrated biasing spring, so that a momentary release of the detent 49 causes the rack to shift rightwards by a distance equal to the spacing between adjoining rack teeth. If it is necessary to shift the rack 48 leftward, this will be done against the force of such biasing spring, the detent 49 not preventing leftward shifting.

In addition to this joint shifting of the originals 45 and 46, it is possible to effect relative shifting between the originals 45 and 46, so as to set the breadth of the mask slit to any desired value. This additional shifting is performed by a further intermittent advancement mechanism of which only a rack 50 and a cooperating detent 51 are illustrated. The original 46 is connected via the associated clamping device with the rack 50, so that by briefly disengaging the detent 51, the original 46 will be moved, under the action of a non-illustrated biasing spring, towards the left a distance equal to the spacing between adjoining rack teeth so as to effect a corresponding widening of the mask slit 47. If the mask slit is to be made narrower, then the rack 50 can be shifted rightwards, either manually or by other suitable means.

FIG. 6 shows the arrangement of FIG. 5 in an end view. The upper original 44 is contained in a transparent jacket 52 secured in a clamping device 53. This arrangement can be swung relative to a rod 55 through the intermediary of a yoke 54; this makes the lower originals readily accessible. Also shown in FIG. 6 is the lower original 45 in its transparent jacket 56 and the associated clamping device 57. The original 46, its transparent jacket and the associated clamping device are all arranged behind the aforementioned components in the picture plane and accordingly are not visible. Riding on a fixed base plate 58 is a longitudinally shiftable guide rail 59 connected with the rack 48. In turn, riding on the guide rail 59 is a further guide rail 60. Guide rail 59 carries clamping devices 57, whereas guide rail 60 carries clamping device 53. Guide rail 60 is longitudinally shiftable relative to the guide rail 59 and connected not only with the clamping device for original 46 but also with the rack 50. Screws 61, 62 and intermediate annuli 63, 64 pivotably mount the detents 49, 51 on the base plate.

It will be understood that each of the elements described above, or two or more together, may also find a useful application in other types of constructions differing from the types described above.

While the invention has been illustrated and described as embodied in combination with exemplary xerographic and electrostatic copiers, it is not intended to be limited to the details shown, since various modifications and structural changes may be made without departing in any way from the spirit of the present invention.

In the illustrated embodiment, the lower originals are longitudinally shiftable whereas the upper original is not. In principle, the relationship could be exactly the opposite. Also, in principle, both the upper and the lower originals could be longitudinally shiftable, although in general the longitudinal shiftability of only the upper or only the lower originals might be utilized at any one time.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a combination with a copier of the type comprised of a transparent support upon which originals to be copied are laid with their image-bearing sides face down, illuminating means for illuminating the image-bearing sides of such originals and means for forming reproductions of the illuminated images, an arrangement for use in the reproduction of printed forms, form letters, and the like, comprising first holding means adjacent the transparent support and operative for holding at least one lower original serving as a mask; second holding means adjacent the transparent support and operative for holding at least one upper original located above the original held by the first holding means so that a portion of the upper original is unblocked by the mask and accordingly exposed for illumination; mounting means mounting at least one holding means for movement relative to the other holding means in the direction of the length of the transparent support, whereby different lines of an image on the upper original can be unblocked by the mask by effecting such relative movement between the two holding means; and intermittent advancement means for automatically effecting stepwise relative movement between the first and second holding means in the direction of the length of the transparent support in steps of predetermined length.

2. The combination defined in claim 1, wherein the intermittent advancement means includes synchronizing means for causing each step of relative movement to occur in response to an activation of the illuminating means.

3. The combination defined in claim 1, wherein the intermittent advancement means includes selecting means activatable by the user of the copier for selecting the number of steps of relative movement to be automatically performed by the intermittent advancement means.

4. In a combination with a copier of the type comprised of a transparent support upon which originals to be copied are laid with their image-bearing sides face down, illuminating means for illuminating the image-bearing sides of such originals and means for forming reproductions of the illuminated images, an arrangement for use in the reproduction of printed forms, form letters, and the like, comprising first holding means adjacent the transparent support and operative for holding at least one lower original serving as a mask, the first holding means being comprised of two parts each operative for holding a respective discrete original spaced apart to form a mask slit, at least one of the two parts being shiftable relative to the other of the two parts in the direction of the length of the transparent support; second holding means adjacent the transparent support and operative for holding at least one upper original located above the original held by the first holding means so that a portion of the upper original is unblocked by the mask and accordingly exposed for illumination; mounting means mounting at least one holding means for movement relative to the other holding means in the direction of the length of the transparent support, whereby different lines of an image on the upper original can be unblocked by the mask by effecting such relative movement between the two holding means; and step-motion advancing means operative when activated by the user of the copier for causing the two parts of the first holding means to move relative to each other a selected number of steps of equal distance.

5. In combination with a copier of the type comprised of a transparent support upon which originals to be copied are laid with their image-bearing sides face down, illuminating means for illuminating the image-bearing sides of such originals and means for forming reproductions of the illuminated images, an arrangement for use in the reproduction of printed forms, form letters, and the like, comprising first holding means adjacent the transparent support and operative for holding at least one lower original serving as a mask; second holding means adjacent the transparent support and operative for holding at least one upper original located above the original held by the first holding means so that a portion of the upper original is unblocked by the mask and accordingly exposed for illumination; mounting means mounting at least one holding means for movement relative to the other holding means; and means for moving the at least one holding means relative to the other holding means in the direction of the length of the transparent support, whereby different lines of an image on the upper original can be unblocked by the mask by effecting such relative lengthwise movement between the two holding means.

6. The combination defined in claim 5, wherein said mounting means comprises means mounting the second holding means unshiftable in the direction of the length of the transparent support and the first holding means shiftable in such direction.

7. The combination defined in claim 6, further including two lower originals serving as mask sections both held by the first holding means in place spaced apart from each other to form a slit, whereby when the first holding means is shifted in such direction successive slit-shaped portions of the image-bearing side of the upper original will be unblocked for illumination.

8. The combination defined in claim 6, wherein the mounting means comprises means mounting the first holding means along the edge of the transparent support structure.

9. The combination defined in claim 8, wherein the first holding means comprises clamping means for clamping the at least one lower original serving as the mask.

10. The combination defined in claim 6, wherein the mounting means comprises means mounting the second holding means along the edge of the transparent support structure.

11. The combination defined in claim 10, wherein the second holding means comprises clamping means for clamping the at least one upper original.

12. The combination defined in claim 5, further including intermittent advancement means for automatically effecting stepwise relative movement between the first and second holding means in the direction of the length of the transparent support in steps of predetermined length.

13. The combination defined in claim 5, wherein the first holding means is comprised of two parts each operative for holding a respective discrete original spaced apart to form a mask slit, at least one of the two parts being shiftable relative to the other of the two parts in the direction of the length of the transparent support.

14. The combination defined in claim 13, the moving means including step-motion advancing means operative when activated by the user of the copier for causing the two parts of the first holding means to move relative to each other a selected number of steps of equal distance.

15. The combination defined in claim 5, wherein the first holding means includes a respective first transparent jacket for receiving at least one lower original, and wherein the second holding means includes a respective second transparent jacket for receiving at least one upper original.

16. The combination defined in claim 5, wherein the first and second holding means are each clamping means operative for directly clamping the respective originals.

17. The combination defined in claim 5, wherein the first and second holding means are each mounted for swinging movement relative to a swinging axis extending parallel to the direction of the length of the transparent support.

18. The combination defined in claim 5, wherein the first and second holding means are each clamping means provided with manually activatable means for releasing the clamping action.

19. The combination defined in claim 5, wherein the first and second holding means are located at respective opposite sides of the transparent support.

* * * * *